(12) United States Patent
Fauser et al.

(10) Patent No.: US 7,444,202 B2
(45) Date of Patent: Oct. 28, 2008

(54) METHOD FOR SMOOTHING POLYLINES IN NC PROGRAMS

(75) Inventors: Matthias Fauser, Grabenstaett (DE); Steffen Lischke, Kirchgandern (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 442 days.

(21) Appl. No.: 11/009,632

(22) Filed: Dec. 10, 2004

(65) Prior Publication Data

US 2005/0190185 A1 Sep. 1, 2005

(30) Foreign Application Priority Data

Dec. 10, 2003 (DE) ................. 103 57 650

(51) Int. Cl.
*G06F 19/00* (2006.01)
(52) U.S. Cl. ............... 700/189; 700/159; 700/186; 700/194
(58) Field of Classification Search ........... 700/159, 700/173, 184, 186, 187, 189, 192, 194, 98; 345/419, 441
See application file for complete search history.

(56) References Cited

U.S. PATENT DOCUMENTS

| | | | | |
|---|---|---|---|---|
| 5,815,401 A | * | 9/1998 | Otsuki et al. ........... 700/189 |
| 6,256,038 B1 | * | 7/2001 | Krishnamurthy ........... 345/419 |
| 6,266,570 B1 | * | 7/2001 | Hocherl et al. ........... 700/193 |
| 6,648,640 B2 | * | 11/2003 | Rubbert et al. ........... 433/24 |
| 6,832,128 B2 | * | 12/2004 | Haupt ........... 700/184 |
| 7,013,191 B2 | * | 3/2006 | Rubbert et al. ........... 700/98 |
| 7,027,642 B2 | * | 4/2006 | Rubbert et al. ........... 345/419 |
| 7,029,275 B2 | * | 4/2006 | Rubbert et al. ........... 433/24 |
| 7,058,213 B2 | * | 6/2006 | Rubbert et al. ........... 382/128 |
| 7,068,825 B2 | * | 6/2006 | Rubbert et al. ........... 345/419 |
| 7,080,979 B2 | * | 7/2006 | Rubbert et al. ........... 433/24 |
| 7,197,179 B2 | * | 3/2007 | Rubbert et al. ........... 345/419 |
| 2003/0171840 A1 | * | 9/2003 | Haupt ........... 700/175 |

FOREIGN PATENT DOCUMENTS

| | | |
|---|---|---|
| DE | 43 03 090 | 8/1994 |
| DE | 44 30 003 | 2/1996 |

* cited by examiner

*Primary Examiner*—Albert DeCady
*Assistant Examiner*—Charles R Kasenge
(74) *Attorney, Agent, or Firm*—Kenyon & Kenyon LLP

(57) ABSTRACT

In a method for smoothing polylines in NC programs, the coordinates of points which, connected by linear segments, represent an original polyline, are shifted in a geometrical filter unit such that a resulting polyline, made up of coordinates of points, is smoothed as compared to the original polyline.

11 Claims, 5 Drawing Sheets

METHOD FOR SMOOTHING POLYLINES IN NC PROGRAMS

CROSS-REFERENCE TO RELATED APPLICATIONS

The present application claims priority to Application No. 103 57 650.9, filed in the Federal Republic of Germany on Dec. 10, 2003, which is expressly incorporated herein in its entirety by reference thereto.

FIELD OF THE INVENTION

The present invention relates to a method for smoothing polylines in NC programs. Such a method may allow for the smoothing of undesirably sharp changes in direction in NC programs, which are primarily made up of linear sets.

BACKGROUND INFORMATION

NC programs, which are generated using an NC programming system, are often made up of a sequence of points. Connecting these points by linear segments produces polylines. The execution of such an NC program in a machine tool may produce undesirably sharp changes in direction between the linear segments. These may be caused by, among other things, numerical inaccuracies in the generation of a path in the NC programming system. Sharp changes in direction, however, may result in an unnecessary loss of time, since their generation may require a reduction in the feed rate so as not to exceed any dynamic limit values of the machine axes. Moreover, troublesome irregularities may be produced on the workpiece surface in the process.

Hence, it may be desirable to smoothen such polylines prior to further processing in a numerical control.

Thus, German Published Patent Application No. 43 03 090 describes a method for generating reference variables for position control loops in numerically controlled machines, in which from sequences of path setpoint values, position setpoint values are generated by filtering and weighting, which are fed to the position control loop as reference variables. Filtering and weighting attenuates sharp changes in direction contained in the path setpoint values.

A disadvantage of a method of this type may be that the effectiveness of the attenuation depends on the feed rate of the machine tool. Thus, at a high feed rate, a strong attenuation is to be expected, while a slow feed rate results in weaker attenuation.

German Published Patent Application No. 44 30 003 describes a method in which data records made up of points describing a polyline are already smoothed before being transferred to the machine tool control. For smoothing the polyline, a plurality of consecutive points are connected to one another by polynomials of a higher order, i.e., the points are no longer connected by linear segments, but rather are approximated by curve paths. A disadvantage of this method is that the approximation by polynomials is computationally very intensive, another is that precisely in the case of irregular polylines, undesirably sharp changes in direction can nevertheless occur at the connecting point of two curve paths.

SUMMARY

According to an example embodiment of the present invention, a method for smoothing polylines is provided.

According to an example embodiment of the present invention, a method is provided in which data records containing coordinates of points that describe an original polyline are transmitted to a geometrical filter unit, in which the coordinates of the points are shifted such that the resulting polyline is smoothed as compared to the original polyline. Subsequently, the coordinates of the points of the resulting polyline are transmitted to a numerical control.

It may be provided that the path of the polyline in front of as well as beyond the point to be filtered is used as a criterion for the shifting of a point. Best results may be provided if points on the path of the polyline lying closer to the point to be filtered are weighted more strongly than points further removed.

According to an example embodiment of the present invention, a method for smoothing polylines in an NC program includes: transmitting data records to geometrical filter unit, the data records including coordinates of points, which, connected by linear segments, represent an original polyline; and smoothing the original polyline by shifting the coordinates of points in the geometrical filter unit so that a resulting polyline made up of points is smoothed as compared to the original polyline.

The shifting of a point may include taking into account a shape of the original polyline in front of and beyond the point to be shifted.

The number of points of the resulting polyline may substantially correspond to the number of points of the original polyline.

The number of points of the resulting polyline may correspond to the number of points of the original polyline.

The shifting of a point in the geometrical unit may include: forming pairs of auxiliary points along the original polyline in front of and beyond the point; establishing weighting factors for the point and the pairs of auxiliary points from a weighting function; and calculating the coordinates of the resulting point by weighting, summing and normalizing the coordinates of the point and the pairs of auxiliary points in accordance with the relationship:

$$P_0^* = \frac{w_0 P_0 + \sum_{n=-j}^{-1} w_n AP_n + \sum_{n=1}^{j} w_n AP_n}{\sum_{n=-j}^{j} w_n};$$

$P_0$ representing the point to be filtered, $P_0^*$ representing the resulting point, j represents the number of pairs of auxiliary points, $AP_n$ represents the auxiliary points and $w_n$ represents the weighting factor.

The pairs of auxiliary points may divide one filter length along the original polyline in front of and beyond the point to be filtered into j equal parts.

The weighting function may weight auxiliary points in close proximity to the point to be filtered more strongly than farther auxiliary points.

The shifting may include not shifting a first point and a last point of the original polyline.

The method may include, for each point of the original polyline, selecting whether to perform the smoothing.

The geometrical filter unit may include a limit value that determines a maximal shift of a point.

The method may include setting artificial contour points at a distance of a filter length so that a gradient of straight lines that are longer than double the filter length remains unchanged.

DETAILED DESCRIPTION

Figure 1:
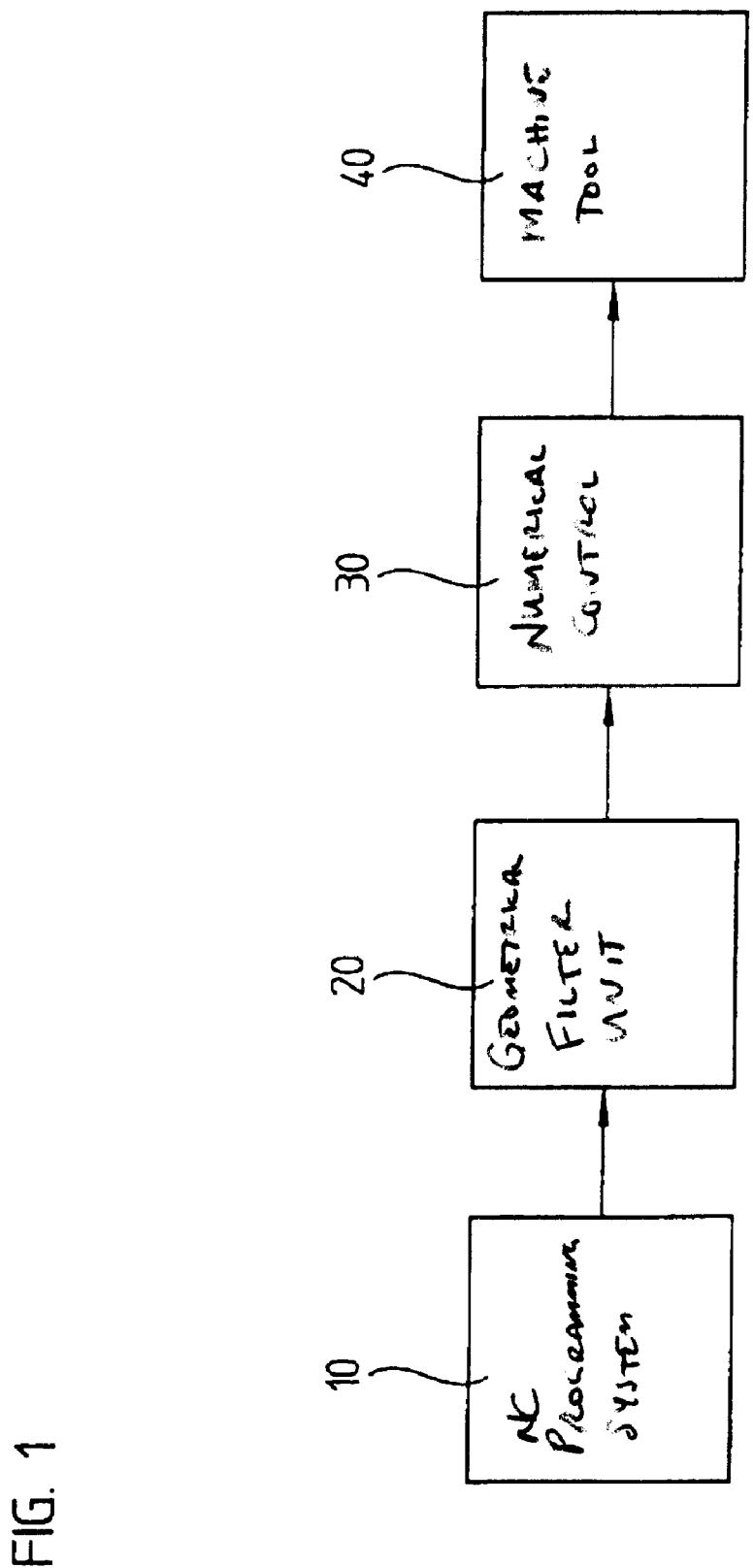
FIG. 1 schematically illustrates an arrangement for generating and processing polylines.

As illustrated in FIG. 1, data records generated by an NC programming system 10 are transmitted to a geometrical filter unit 20. There data records containing the coordinates of points representing a polyline are smoothed and passed on to a numerical control 30. All other curve shapes, such as may be generated, e.g., by conical sections or by polynomials of higher order, etc., remain unaffected by geometrical filter unit 20 and are sent directly to numerical control 30. Numerical control 30 uses the incoming data records for controlling the drives of a machine tool 40 in order to machine a workpiece in the desired manner.

Figure 2:
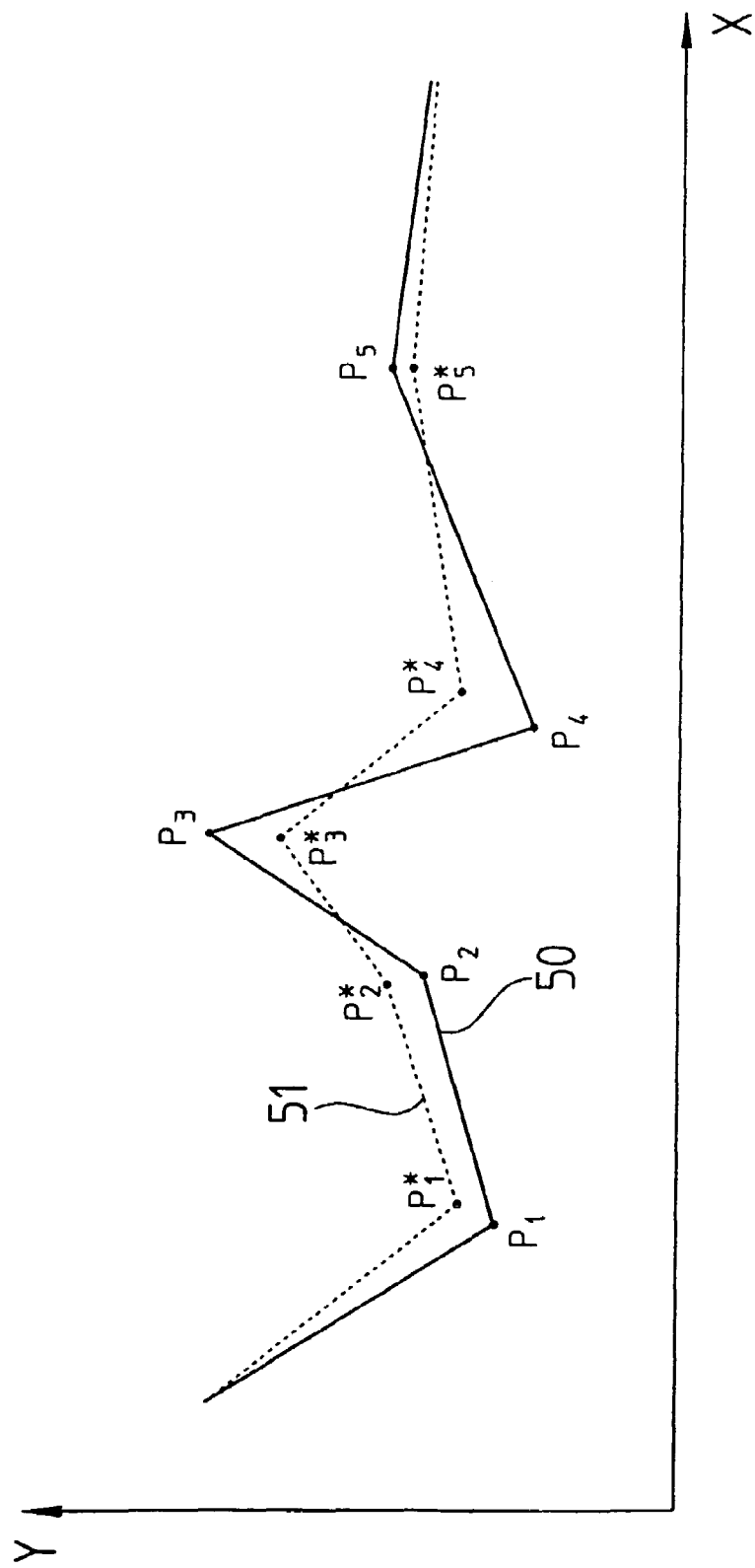
FIG. 2 illustrates an example for a polyline prior and following smoothing in the geometrical filter unit.

FIG. 2 illustrates, by example, an original polyline 50, the shape of which is defined by the points $P_1$-$P_5$, as well as a resulting polyline 51, defined by the points $P_1^*$-$P_5^*$, which is smoothed in comparison to the original polyline 50. For simplicity, a two-dimensional representation is chosen, although it should be appreciated that the method may be used in three-dimensional space as well. Resulting polyline 51 is characterized by a markedly smoother shape and therefore may produce a smoother contour than original polyline 50 when the workpiece is machined in the machine tool. This furthermore may result in a higher machining speed, since the changes in direction necessary for machining the workpiece may be less pronounced and thus no strong reductions of the feed rate of the machine tool may be required.

The number of points $P_1^*$-$P_5^*$ that make up resulting polyline 51 essentially corresponds to the number of points $P_1$-$P_5$ that make up original polyline 50.

Figure 3:
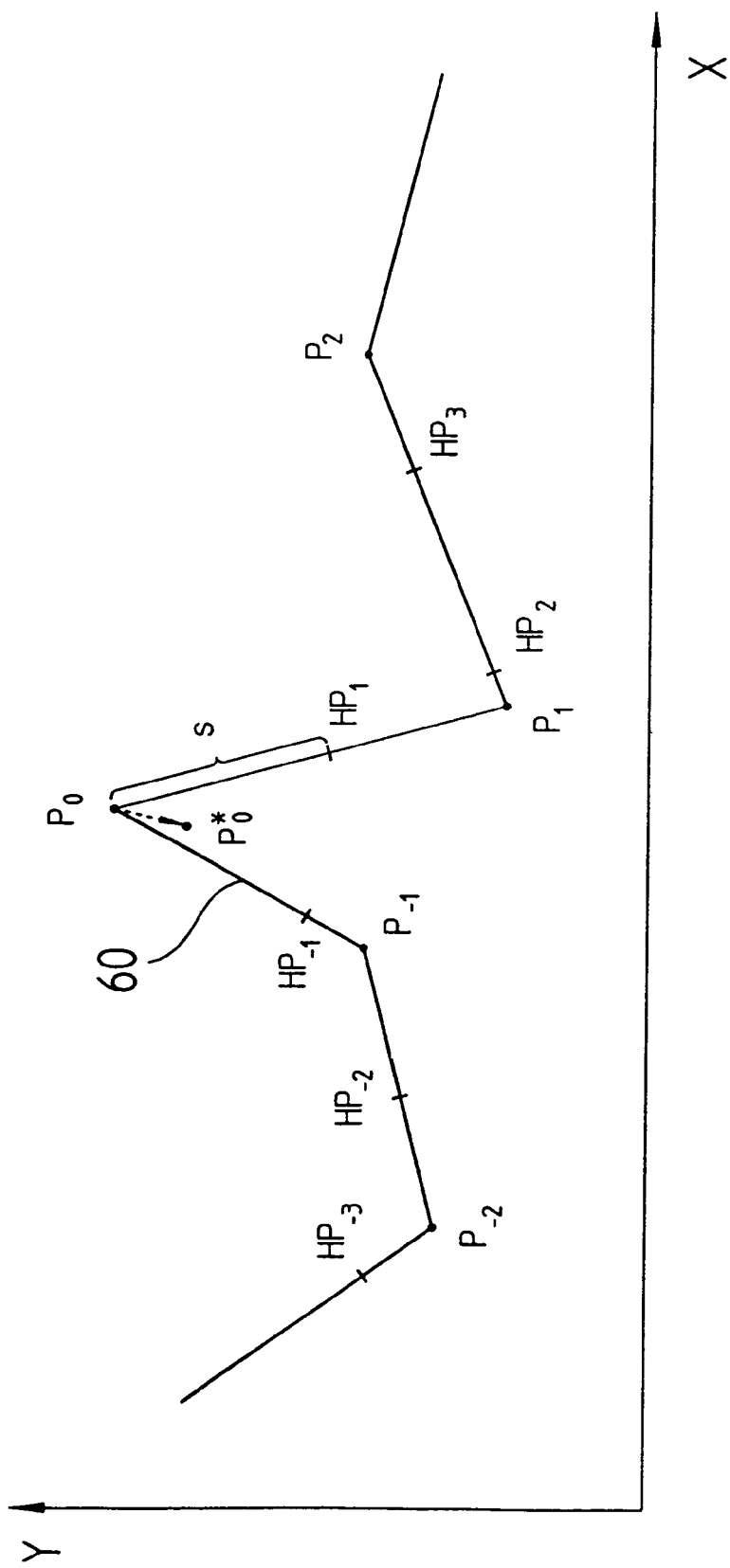
FIG. 3 illustrates a representation of an example smoothing algorithm.
Figure 4:
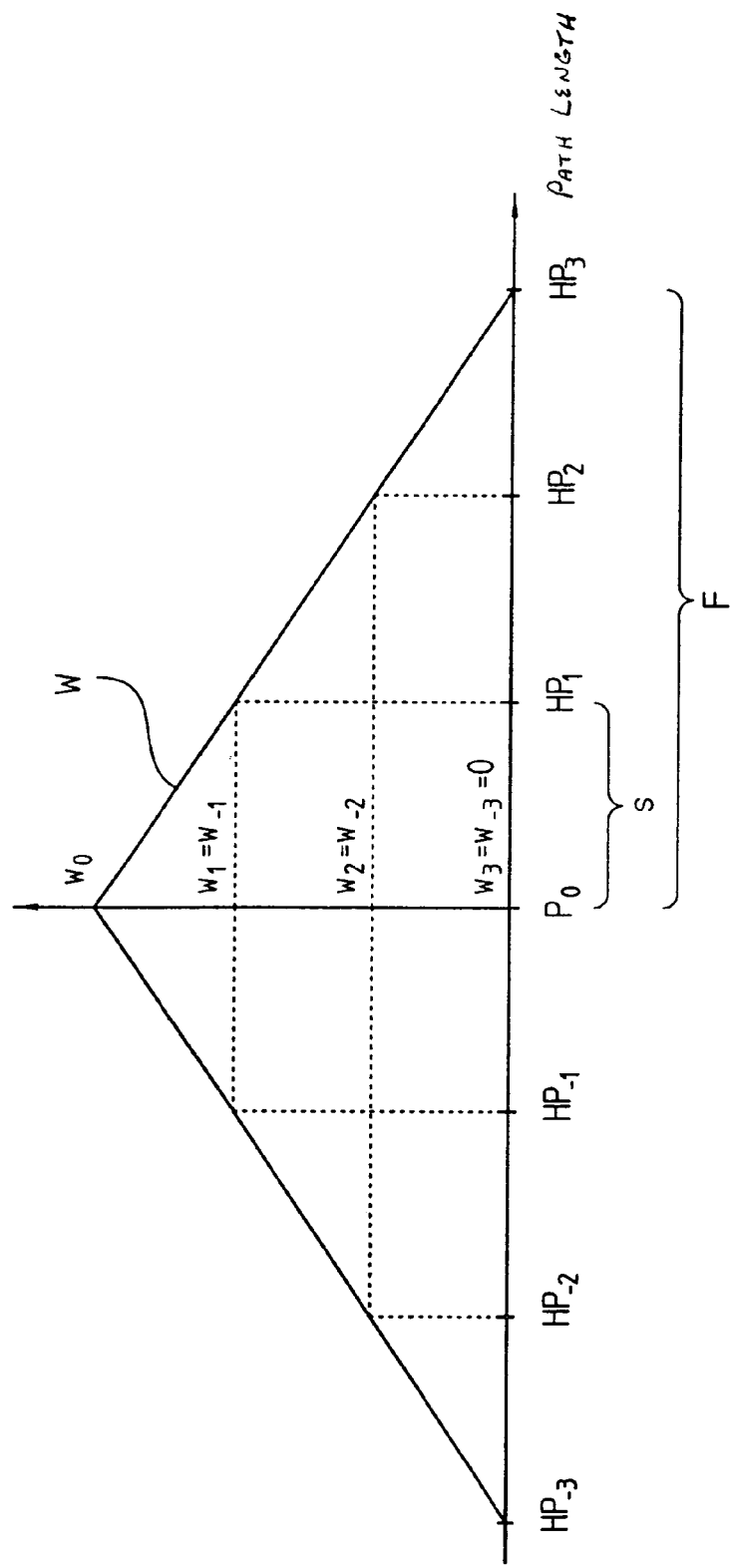
FIG. 4 illustrates an example of a weighting function.

An example method for smoothing polylines is described with reference to FIGS. 3 and 4. FIG. 3 illustrates a segment of an original polyline 60, the shape of which is defined by the points $P_{-2}$-$P_2$. $P_0$ is assumed in the following as the point to be filtered.

First a filter length F is defined, which establishes in what area, in front of and beyond the point to be filtered $P_0$, original polyline 60 is to be drawn upon for filtering. Thus, altogether an area of 2*F is taken into consideration for the filtering of point $P_0$. Here filter length F is measured as the length of the polyline from the point to be filtered $P_0$ along the linear segments between points $P_{-2}$-$P_2$. Which value is chosen for filter length F depends on various factors such as, for example, the allowed dimensional tolerances or the required surface quality, etc. In practice, a value of one millimeter for filter length F (F=1 mm) may be practical in many cases.

Now, beginning at point $P_0$, j pairs of auxiliary points $[AP_{-1}; AP_{+1}]$, $[AP_{-2}; AP_{+2}]$, ..., $[AP_{-j}; AP_{+j}]$ are generated, which respectively divide filter length F along the polyline in front of and beyond point $P_0$ into j equal parts of the length s. In FIG. 3, for a simplified representation, the value j=3 is chosen for the number of pairs of auxiliary points, while j=5 may be provided for many applications. Depending on the application, another value may also be used for j.

Now, using a weighting function w, weighting factors $w_n$ are assigned to point $P_0$ to be filtered as well as to the pairs of auxiliary points $[AP_{-1}; AP_{+1}]$, $[AP_{-2}; AP_{+2}]$, ... $[AP_{-j}; AP_{+j}]$. FIG. 4 illustrates a typical characteristic of a weighting function w. Together with the horizontal coordinate axis, it forms an isosceles triangle, the sides of which intersect the horizontal coordinate axis in both directions at the distance of filter length F. This characteristic may ensure that the auxiliary points that are closer to point $P_0$ to be filtered are weighted more strongly than auxiliary points that are further removed. Moreover, in this special weighting function, when calculating the coordinates of resulting point $P_0^*$, the two outer auxiliary points, $AP_{-j}$ and $AP_{+j}$ are no longer necessary, since the associated weighting factors $w_{-j}$ and $w_{+j}$ are equal to '0'. The scaling of the weighting function in the vertical coordinate axis is arbitrary. The intersection of weighting function w with the vertical coordinate axis may be normalized to '1'. Since this intersection at the same time corresponds to the value of weighting factor $w_0$ for point $P_0$ to be filtered, it is possible to dispense with a weighting of point $P_0$ to be filtered.

For calculating the coordinates of resulting point $P_0^*$, the coordinates of auxiliary points $[AP_{-1}; AP_{+1}]$, $[AP_{-2}; AP_{+2}]$, ..., $[AP_{-j}; AP_{+j}]$ and the original coordinates of point $P_0$ are weighted using weighting factors $w_n$, the weighted coordinates being summed up and normalized according to the relationship:

$$P_0^* = \frac{w_0 P_0 + \sum_{n=-j}^{-1} w_n HP_n + \sum_{n=1}^{j} w_n HP_n}{\sum_{n=-j}^{j} w_n}$$

In this manner, all points of original polyline 60 except for the first and the last points are filtered. Since the first and the last points of a polyline may always indicate invariable positions on the outer contour of the workpiece, their coordinates remain excluded from the geometrical filtering.

For clarity, in the further description, points defining original polylines 50, 60 are indicated by $P_i$, while points defining the shape of resulting polylines 51 are indicated by $P_i^*$.

Figure 5:
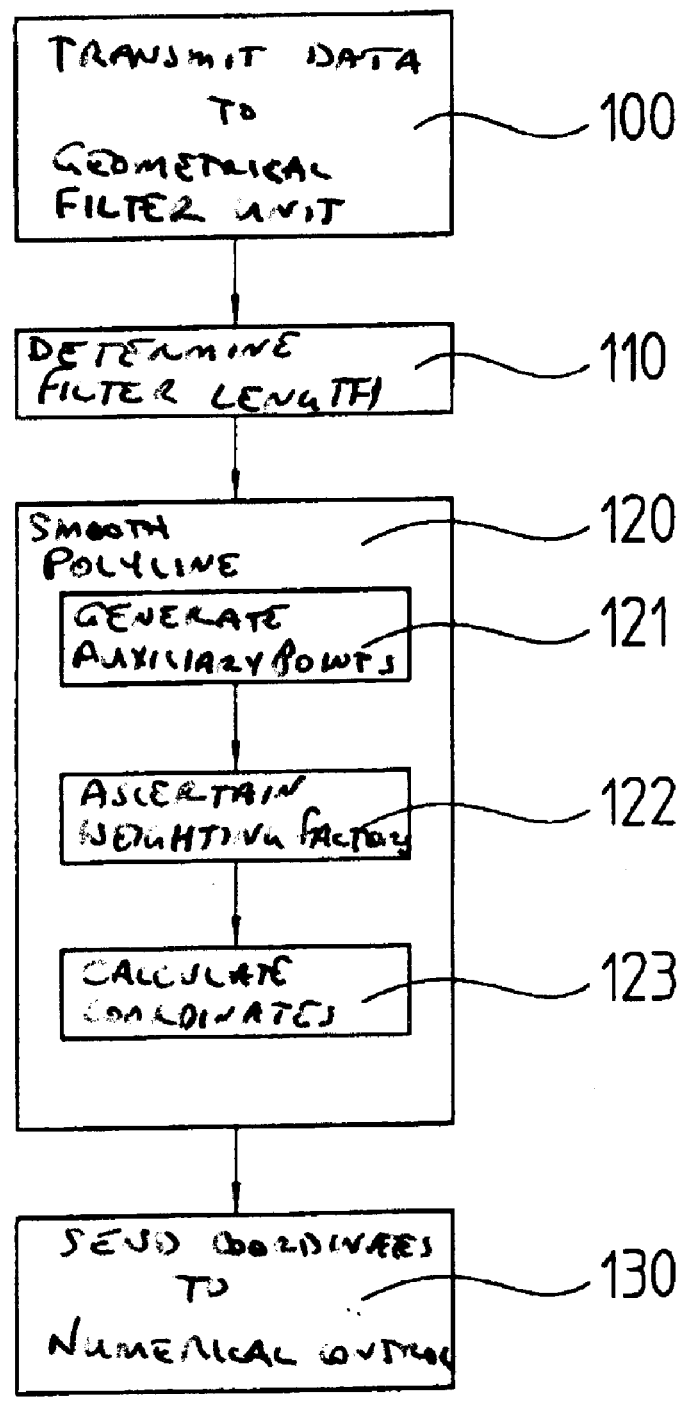
FIG. 5 is a block diagram illustrating the method steps.

FIG. 5 summarizes the individual method steps once more in a block diagram. In step 100, the data records that define a polyline 50, 60 are transmitted to geometrical filter unit 20. Subsequently, a filter length F is determined in step 110. Original polyline 50, 60 is smoothed by shifting points $P_i$ in step 120. The latter is subdivided into three steps: in step 121, pairs of auxiliary points $[AP_{-1}; AP_{+1}]$, $[AP_{-2}; AP_{+2}]$, ..., $[AP_{-j}; AP_{+j}]$ in front of and beyond point $P_0$ to be filtered are generated, in step 122, weighting factors $w_n$ are ascertained, and in step 123, the coordinates of resulting point $P_0^*$ are calculated. In step 130, the coordinates of points $P_i^*$ of resulting polyline 51 are sent to a numerical control 30 for further processing.

Here it should be understood that FIG. 5 is to be regarded only as an example and that the individual method steps may vary within the context hereof. Thus, the determination of filter length F in step 110 is to be regarded as optional. It may be dispensed with, for example, if filter length F is provided as fixed in geometrical filter unit 20 or is generated automatically by calculation. Furthermore, in step 120, an alternative method for shifting points $P_i$ may also be used.

Since for the implementation of the method, points $P_i$ in front of point $P_0$ to be filtered as well as points $P_j$ beyond point $P_0$ to be filtered are taken into account, a device for storing data records is provided in geometrical filter unit 20. In this context, a data record is defined as the coordinates of one point $P_i$ of polyline 50, 60. The device for storing data records may be a ring buffer, for example. At the beginning of the process, this ring buffer is filled with coordinates of points $P_i$ of original polyline 50, 60. As soon as the coordinates of a point $P_i$ in the ring buffer, which is arranged in front of point $P_0$ currently to be filtered, are no longer relevant for smoothing, they are discarded and the ring buffer is again filled with coordinates of a point $P_j$, which is arranged beyond point $P_0$ currently to be filtered. A point is no longer relevant, if between it and point $P_0$ to be filtered there additionally exists a point $P_i$, which is at a distance of at least filter length F from point $P_0$ to be filtered.

In case the distance between point $P_0$ to be filtered and the first or last point of the ring buffer is less than one filter length F, only as many pairs of auxiliary points $[AP_{-1}; AP_{+1}]$, $[AP_{-2}; AP_{+2}]$, ..., $[AP_{-j}; AP_{+j}]$ are produced as may be generated according to the above rule.

Since within a polyline 50, 60 there may be points $P_i$ whose spatial position may not be changed, since they may be important for the outer contour of the workpiece to be produced, it may be provided that the application of the method for smoothing is selectable for every point of polyline 50, 60, i.e., if it may be selectively activated or deactivated. This may be accomplished, for example, by appropriate commands in the NC program.

Furthermore, it may be provided that there be a limit value for the maximal shift of points $P_i$ of original polyline 50, 60, which is used if resulting point $P_0^*$, shifted by the above rule, is at a distance greater than the limit value from original point $P_0$. This may ensure that resulting polyline 51 and thus the outer contour of the workpiece does not deviate too much from the form determined in NC programming system 10. The limit value in this context may be provided as fixed in geometrical filter unit 20 or may also be adjustable via the NC program.

Attention should also be paid to the aspect that the smoothing of a polyline 50, 60 should not change the gradient of long straight lines, since the accuracy of fit of the contour of the workpiece depends on it and, e.g., in the milling out of planes, irregular surface structures may result. A simple method for maintaining the gradient of straight lines that are longer than double the filter width F may be to set an artificial contour point behind the starting point as well as in front of the end point of the straight line at a distance of filter width F. These artificial contour points remain unchanged according to the method described above. Since they are on the contour of original polyline 50, 60, this means that the gradient of the linear segment between these two artificial contour points is not changed either. The number of points $P_i^*$ of resulting polyline 51 compared to the number of points $P_i$ of original polyline 50, 60 is thereby not increased significantly.

Other methods for smoothing original polyline 50, 60 may be used as well.

The method may be implemented as stand-alone software running on a computer, or it may also be implemented as a program module in NC programming system 10 or in numerical control 30.

What is claimed is:

1. A method for smoothing polylines in an NC program, comprising:

transmitting data records to a geometrical filter unit, the data records including coordinates of points, which, connected by linear segments, represent an original polyline; and smoothing the original polyline by shifting the coordinates of points in the geometrical filter unit so that a resulting polyline made up of points is smoothed as compared to the original polyline;

wherein the shifting of a point in the geometrical filter unit includes:

forming pairs of auxiliary points along the original polyline in front of and beyond the point;

establishing weighting factors for the point and the pairs of auxiliary points from a weighting function; and calculating the coordinates of the resulting point by weighting, summing and normalizing the coordinates of the point and the pairs of auxiliary points.

2. The method according to claim 1, wherein the shifting of a point includes taking into account a shape of the original polyline in front of and beyond the point to be shifted.

3. The method according to claim 1, wherein the number of points of the resulting polyline substantially corresponds to the number of points of the original polyline.

4. The method according to claim 1, wherein the number of points of the resulting polyline corresponds to the number of points of the original polyline.

5. The method according to claim 1, wherein the coordinates of the resulting point are calculated in accordance with the relationship:

$$P_0^* = \frac{w_0 P_0 + \sum_{n=-j}^{-1} w_n AP_n + \sum_{n=1}^{j} w_n AP_n}{\sum_{n=-j}^{j} w_n};$$

wherein $P_0$ represents the point to be filtered, $P_0^*$ represents the resulting point, j represents the number of pairs of auxiliary points, $AP_n$ represents the auxiliary points and $w_n$ represents the weighting factor.

6. The method according to claim 5, wherein the pairs of auxiliary points divide one filter length along the original polyline in front of and beyond the point to be filtered into j equal parts.

7. The method according to claim 5, wherein the weighting function weights auxiliary points in close proximity to the point to be filtered more strongly than farther auxiliary points.

8. The method according to claim 1, wherein the shifting includes not shifting a first point and a last point of the original polyline.

9. The method according to claim 1, further comprising, for each point of the original polyline, selecting whether to perform the smoothing.

10. The method according to claim 1, wherein the geometrical filter unit includes a limit value that determines a maximal shift of a point.

11. The method according to claim 1, further comprising setting artificial contour points along the original polyline at a distance of a filter length so that a gradient of straight lines of the original polyline that are longer than double the filter length remains unchanged.

* * * * *